US010657239B2

(12) United States Patent
Gravenites et al.

(10) Patent No.: US 10,657,239 B2
(45) Date of Patent: May 19, 2020

(54) LIMITING ACCESS TO APPLICATION FEATURES IN CLOUD APPLICATIONS

(71) Applicant: Oracle International Corporation, Redwood Shores, CA (US)

(72) Inventors: Greg Gravenites, Littleton, CO (US); Arif Rafique, Parker, CO (US); Rajan Mahendrakumar Modi, Highlands Ranch, CO (US); Sindhu Suresh, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 130 days.

(21) Appl. No.: 15/720,940

(22) Filed: Sep. 29, 2017

(65) Prior Publication Data
US 2018/0341762 A1 Nov. 29, 2018

Related U.S. Application Data

(60) Provisional application No. 62/510,979, filed on May 25, 2017.

(51) Int. Cl.
*H04L 29/06* (2006.01)
*G06F 21/33* (2013.01)
(Continued)

(52) U.S. Cl.
CPC ............ *G06F 21/335* (2013.01); *G06F 21/62* (2013.01); *G06F 21/629* (2013.01); *H04L 9/088* (2013.01);
(Continued)

(58) Field of Classification Search
CPC ...... G06F 21/335; G06F 21/629; G06F 21/62; H04L 9/088; H04L 9/3213; H04L 63/067;
(Continued)

(56) References Cited

U.S. PATENT DOCUMENTS 6,430,549 B1 8/2002 Gershfield et al.
6,513,121 B1* 1/2003 Serkowski ............. G06F 21/10
209/203

(Continued)

OTHER PUBLICATIONS

'Creating a User Environment in Red Hat Cloud Infrastructure';Red Hat Customer, Feb. 20, 2015, Portal https://access.redhat.com/articles/1345303.

(Continued)

*Primary Examiner* — David Garcia Cervetti
(74) *Attorney, Agent, or Firm* — Kilpatrick Townsend & Stockton LLP

(57) ABSTRACT

Techniques are provided for limiting access to a feature in an application. Certain application features, such as access controlled features, are not generally accessible to all users of an integration cloud service system. When a user makes a request to access an access controlled feature, the system can determine whether user information satisfies the requirements to access a requested access controlled feature. If the user satisfies the requirements for the requested access controlled feature, an access key can be dynamically generated based on the user information.

20 Claims, 9 Drawing Sheets

(51) Int. Cl.
*G06F 21/62* (2013.01)
*H04L 9/32* (2006.01)
*H04L 9/08* (2006.01)

(52) U.S. Cl.
CPC .......... *H04L 9/3213* (2013.01); *H04L 63/062* (2013.01); *H04L 63/067* (2013.01); *H04L 63/068* (2013.01); *H04L 63/0807* (2013.01); *H04L 63/102* (2013.01); *H04L 9/0816* (2013.01)

(58) Field of Classification Search
CPC ... H04L 63/102; H04L 63/062; H04L 9/0816; H04L 63/0807
See application file for complete search history.

(56) References Cited

U.S. PATENT DOCUMENTS

| | | | |
|---|---|---|---|
| 6,982,626 B2 * | 1/2006 | Nedorezov | G08C 17/00 340/5.2 |
| 7,290,144 B1 * | 10/2007 | Kitaj | G06F 21/6218 380/44 |
| 7,844,572 B2 * | 11/2010 | Walker | G06F 21/10 705/59 |
| 8,001,383 B2 * | 8/2011 | Hughes | G06F 21/10 713/171 |
| 8,229,858 B1 * | 7/2012 | Mazza | G06F 21/10 705/59 |
| 8,261,365 B2 * | 9/2012 | Ksontini | H04L 63/0853 726/29 |
| 8,701,210 B2 * | 4/2014 | Cheng | F24F 11/30 726/34 |
| 8,738,535 B2 * | 5/2014 | Gaetano, Jr. | G06Q 20/00 705/59 |
| 8,984,589 B2 | 3/2015 | Liu | |
| 9,131,169 B2 * | 9/2015 | Nagunno | H04N 1/00912 |
| 9,215,229 B2 | 12/2015 | Eicken et al. | |
| 9,401,929 B2 | 7/2016 | Cooper | |
| 9,485,223 B2 * | 11/2016 | Daskalopoulos | G06F 21/10 |
| 9,491,111 B1 * | 11/2016 | Roth | H04L 63/0428 |
| 10,270,853 B2 * | 4/2019 | Toepke | H04L 67/1095 |
| 2006/0247606 A1 * | 11/2006 | Batch | A61M 5/1413 606/1 |
| 2007/0136677 A1 * | 6/2007 | Agarwal | G06F 3/0481 715/767 |
| 2008/0027742 A1 * | 1/2008 | Maeda | G06F 21/105 705/1.1 |
| 2008/0189793 A1 * | 8/2008 | Kirkup | G06F 21/53 726/27 |
| 2009/0122356 A1 * | 5/2009 | Mihira | H04N 1/00127 358/402 |
| 2009/0150831 A1 * | 6/2009 | Young | G16H 40/40 715/845 |
| 2009/0150865 A1 * | 6/2009 | Young | G16H 40/40 717/120 |
| 2009/0241107 A1 * | 9/2009 | Kobayashi | G06F 21/10 717/178 |
| 2009/0274304 A1 * | 11/2009 | Kobayashi | G06F 21/10 380/277 |
| 2009/0310787 A1 * | 12/2009 | Nishimi | G06F 21/335 380/277 |
| 2009/0328225 A1 * | 12/2009 | Chambers | G06F 21/10 726/26 |
| 2010/0058482 A1 * | 3/2010 | Nagumo | H04N 1/00912 726/26 |
| 2010/0071069 A1 * | 3/2010 | Sugiura | G06F 21/105 726/26 |
| 2010/0162370 A1 * | 6/2010 | Altay | G06F 21/335 726/5 |
| 2010/0162407 A1 * | 6/2010 | Hosoda | G06F 8/61 726/26 |
| 2010/0250960 A1 * | 9/2010 | Ogura | G06F 21/10 713/189 |
| 2010/0251346 A1 * | 9/2010 | Dumais | G06F 21/10 726/5 |
| 2010/0262963 A1 * | 10/2010 | Wassermann | G06F 21/10 717/178 |
| 2010/0281102 A1 * | 11/2010 | Chinta | G06F 21/53 709/203 |
| 2011/0004878 A1 * | 1/2011 | Divoux | G06F 9/4856 718/1 |
| 2011/0083178 A1 * | 4/2011 | Fukata | G06F 21/123 726/21 |
| 2011/0162079 A1 * | 6/2011 | Amimoto | G06F 21/10 726/26 |
| 2011/0173251 A1 * | 7/2011 | Sandhu | G06F 8/61 709/203 |
| 2011/0276959 A1 * | 11/2011 | Kobayashi | G06F 8/61 717/174 |
| 2012/0047499 A1 * | 2/2012 | Krzystofczyk | G06F 8/63 717/174 |
| 2012/0054250 A1 * | 3/2012 | Williams | G06F 16/2358 707/803 |
| 2012/0054494 A1 | 3/2012 | Hiribarren et al. | |
| 2012/0066670 A1 * | 3/2012 | McCarthy | G06F 8/61 717/169 |
| 2012/0204032 A1 * | 8/2012 | Wilkins | H04L 9/006 713/170 |
| 2012/0330786 A1 * | 12/2012 | Paleja | G06Q 30/02 705/26.41 |
| 2013/0111564 A1 * | 5/2013 | Jin | H04N 1/4413 726/4 |
| 2013/0151679 A1 | 6/2013 | Banerjee et al. | |
| 2013/0297456 A1 | 11/2013 | Annan et al. | |
| 2013/0311894 A1 | 11/2013 | Rexer et al. | |
| 2014/0032350 A1 * | 1/2014 | Biswas | G06F 21/125 705/26.3 |
| 2014/0108649 A1 * | 4/2014 | Barton | G06F 9/45533 709/224 |
| 2014/0157368 A1 * | 6/2014 | Shah | H04L 63/08 726/4 |
| 2014/0230068 A1 * | 8/2014 | Kundapur | G06F 21/125 726/26 |
| 2015/0106736 A1 * | 4/2015 | Torman | G06Q 10/06 715/745 |
| 2015/0261518 A1 * | 9/2015 | Viswanathan | G06F 8/71 717/168 |
| 2015/0334105 A1 * | 11/2015 | Kessler | G06F 21/41 726/5 |
| 2015/0347542 A1 * | 12/2015 | Sullivan | G06F 16/254 707/602 |
| 2016/0044024 A1 | 2/2016 | Hwang | |
| 2016/0048695 A1 | 2/2016 | Cucinotta | |
| 2016/0065555 A1 | 3/2016 | Branden | H04L 63/0807 726/7 |
| 2016/0103675 A1 * | 4/2016 | Aabye | G06F 8/65 717/170 |
| 2016/0164881 A1 * | 6/2016 | Bankowski | H04W 4/70 726/4 |
| 2016/0173281 A1 * | 6/2016 | White | H04L 9/0844 713/171 |
| 2016/0179855 A1 * | 6/2016 | Roman | H04L 63/08 707/744 |
| 2016/0191499 A1 * | 6/2016 | Momchilov | H04L 9/0822 713/171 |
| 2016/0337346 A1 * | 11/2016 | Momchilov | H04W 12/0023 |
| 2016/0378439 A1 * | 12/2016 | Straub | G06F 8/34 717/107 |
| 2017/0006131 A1 * | 1/2017 | Dennis | H04L 41/22 |
| 2017/0019551 A1 * | 1/2017 | Ge | H04N 1/00941 |
| 2017/0048252 A1 * | 2/2017 | Straub | H04L 67/10 |
| 2017/0054571 A1 * | 2/2017 | Kitchen | H04L 12/2818 |
| 2017/0132406 A1 * | 5/2017 | Torii | G06F 21/45 |
| 2017/0201886 A1 * | 7/2017 | Yang | H04L 9/0841 |
| 2018/0068095 A1 * | 3/2018 | Yamazaki | G06F 21/10 |
| 2018/0212785 A1 * | 7/2018 | Peddada | H04L 9/3271 |
| 2018/0234459 A1 * | 8/2018 | Kung | H04L 63/20 |
| 2018/0278612 A1 * | 9/2018 | Pattar | H04L 63/0435 |

(56) References Cited

U.S. PATENT DOCUMENTS

2018/0337794 A1* 11/2018 Casaletto .............. G06F 11/301
2019/0294613 A1*  9/2019 Sullivan ................ G06F 16/254
2019/0324971 A1* 10/2019 Vasudev ................ G06F 16/22

OTHER PUBLICATIONS

Cloud Access Optimization Solutions for Enterprise; Oct. 2014, Allot Communications Ltd. http://www.allot.com/wp-content/uploads/SB_CAO-for-Enterprise_2014_publish.pdf.

* cited by examiner

LIMITING ACCESS TO APPLICATION FEATURES IN CLOUD APPLICATIONS

CROSS REFERENCE TO RELATED APPLICATION

This application claims priority to U.S. Provisional Patent Application No. 62/510,979 filed on May 25, 2017 in the United States Patent and Trademark Office, entitled "INTEGRATION CLOUD SERVICE," the disclosure of which is incorporated by reference herein in its entirety.

BACKGROUND

Example embodiments are related to the field of application feature access, and specifically to limiting access to application features. Example embodiments are directed to methods, devices, systems and computer readable media for limiting access to an application feature in a cloud application, such as an integration cloud service application.

A user may have one or more applications that they would like to integrate. Data in the first application may be used by a second application. Therefore, the first application can be integrated with the second application. For example, a human resources application may be integrated with a marketing application so that the marketing application can use the customer records in the human resources application.

A user may desire to perform functions on their integrated application. However, some functions may have certain requirements before the action can be used in an integration. Users who are unaware of the requirements may try to apply the action to their integration, which can result in detrimental errors. Therefore, it may harmful to give an inexperienced or untrained user automatic access to such functions when they are creating their integration. If an inexperienced or untrained user has access to such functions, this may adversely affect the data that is being integrated or may produce undesired integration results.

In the past, in order to prevent untrained or inexperienced users from applying such functions, a static key could be provided that would allow the user to access a function. However, a static key is not secure because the same key can be used repeatedly by the same user, and static key can also be used by different users. Therefore, it is difficult to determine whether the user is actually authorized to use the functionality. Alternatively, functionalities may not be provided to any users in order to prevent incorrect usage of an application functionality.

SUMMARY

Applications may be integrated or combined so that data between applications can be shared. Different types of applications, including on-premise and cloud applications, may be integrated by an integration cloud service system. The applications may be stored in a cloud environment or may be on-premise at a location of the application provider. By integrating applications, a user may be able to perform desired functions more quickly and efficiently.

An integration in an integration cloud service system can be defined by a number of artifacts including a flow definition and supporting artifacts, such as Web Services Description Language (WSDLs), J2EE Connector Architecture (JCA) files and XML Schema Definitions (XSDs). These artifacts form can integration cloud service project which can be a base unit in terms of development, implementation, activation and import/export.

In order to integrate data from a first application to a second application, an integration flow can be created. Through an integration flow, data from a first application can be made to be compatible with a second application. An integration flow can also be referred to as an integration, a flow, or an orchestration. In order to integrate applications, an integration flow can be created that specifies how data in the first application is to be integrated or combined with the second application so that the data from the first application can be used by the second application. Therefore, an integration flow is a flow of data from one system to another system.

An integration flow can be created which identifies one or more data sources and actions to be performed on the data. An integration flow allows an integration to be configured such that a source payload can be inspected and decisions can be made as to whether the payload should be delivered to the configured target or if data should be sent conditionally to a different configured target. For example, an integration flow can include one source application, one or more actions and one or more target applications.

Further, an integration flow can include a source application and several different target applications. The source and target applications can occur throughout the integration flow. One or more applications can be placed between the first application (e.g., source application) and the second application (e.g., target application). In an integration flow, there can be applications that are placed between the source application and the target application. The target application can be an application that will respond to a message that is generated by the source application.

The source application may be, for example, a human resources application that formats an employee record by "first name, last name." The target application may be, for example, a new version of the human resources application that format an employee record by "last name, first name." An integration flow can be created that applies an action to the records in the source application so that the data in the record will be compatible with the target application.

After the design of the integration flow has been completed, the integration can be activated. When the integration is active, messages can flow through the integration. Users of an integration may want to apply features to their integration. Features are, for example, actions or functionalities that can be applied to an integration.

However, it may not be beneficial for all users of an integration cloud service system to be able to readily access all possible features. For example, a user may not be qualified to use the feature, or the user should be supervised when using the functionality. Therefore, it would be beneficial to provide limited access to particular application features.

An example embodiment is directed to limiting access to application features in cloud applications. It may be beneficial to limit access to select cloud application features so that such features can only be used by users in, for example, certain environments or certain cloud application instances. Also, it may be beneficial to monitor certain functionalities and ensure that only authorized users are accessing the functionality. The requirements for feature access can be determined by, for example, a product manager of an integration cloud service system. A product manager can monitor the status of an integration cloud service system and applications operating on the integration cloud service system.

In an example embodiment, access to features can be limited to users having predefined application permissions and/or roles. Further, access to features can be limited based on environment (e.g., a production environment or a development environment), system information (e.g., version of the cloud integration system), and feature information. For example, if an application instance is during development (e.g., development instance), access to a particular feature may generally be allowed. But if an application instances is during production (e.g., production instance), access to the feature may be limited so that access is only allowed for a particular version of the application instance, for a specific period of time, for a particular user or user role, or other application instance attributes or feature attributes. However, these are merely examples, and a fewer or more requirements may be needed in order to access a feature.

The foregoing, together with other features and embodiments will become more apparent upon referring to the following specification, claims, and accompanying drawings.

BRIEF DESCRIPTION OF THE DRAWINGS

The disclosure will be readily understood by the following detailed description in conjunction with the accompanying drawings, wherein like reference numerals designate like elements, and in which.

DETAILED DESCRIPTION

In the following description, for the purposes of explanation, specific details are set forth in order to provide a thorough understanding of example embodiments. However, it will be apparent that various embodiments may be practiced without these specific details. For example, systems, algorithms, structures, techniques, networks, processes, and other components may be shown as components in block diagram form in order not to obscure the embodiments in unnecessary detail. The figures and description are not intended to be restrictive.

Various features can be applied to a cloud application. A cloud application may be referred to as an application, an integration application, or an integrated cloud services application. A feature can include a functionality or an action that can be applied to data in the integration. Features can be accessed during design time and runtime. Features can include standard features and access controlled features.

Standard features are features that can be accessed by all users of the integration system and are publicly available. Standard features can be features which do not require an access key and are readily available for user access. Examples of standard features include activate, deactivate, and look-up.

A user can be, for example, an end-user. An end-user can include customers that are developing an enterprise or an integration in an integration cloud service system.

Access controlled features are features that have been identified as requiring special access in order to use the feature. Special access can include the requirement of an access key in order to access the feature. An access controlled feature can also be known as an access controlled application feature or a special feature. A feature may be identified as an access controlled feature if certain system requirements are necessary before a user can apply the feature to their integration. A feature that may have adverse effects if applied incorrectly can be identified as an access controlled feature.

Examples of access controlled features include an early uptake mode, start run request, pause run request, resume run request, stop run request, delete run request, post compression, post migration and put recovery config. However, these are merely examples of access control features and features that are identified as access control features can vary over time, or as designated by, for example, a product manager. Features that are initially identified as access controlled features can become standard features. For example, if a feature becomes more well-known and readily understood by many users, there is a lower risk of incorrect use of the feature. Therefore, such a feature can be changed to a standard feature by, for example, a product manager.

I. Method Overview

Figure 1:
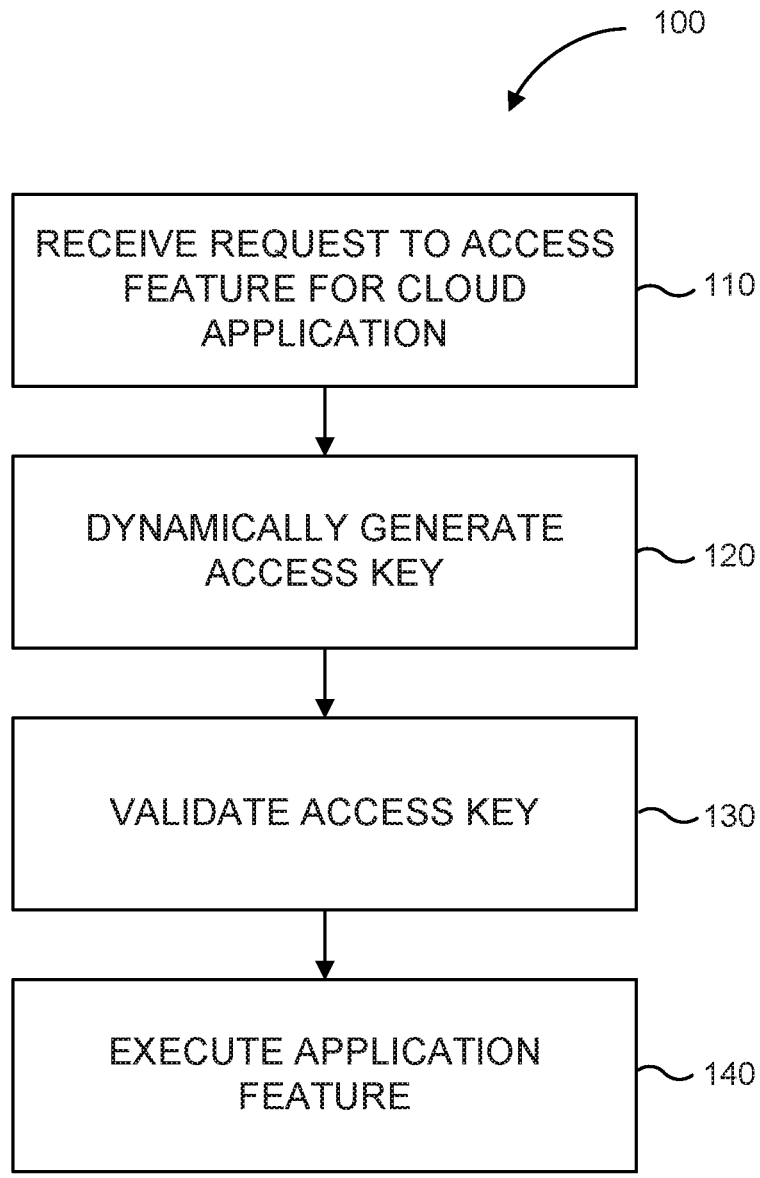
FIG. 1 illustrates an overview of a method for providing access to a feature, in accordance with some example embodiments.

FIG. 1 illustrates an overview of a method of 100 for providing access to a feature, in accordance with some example embodiments. FIG. 1 is merely an overview and a more detailed explanation is provided in the subsequent drawings.

At step 110, a request is received to access a feature for a cloud application. For example, a user may become aware of a feature that is available in an integration cloud service system. A user can be an end user or customer of an integration cloud service system. However, in attempting to access the feature, they may be provided with the notification that the feature that they would like to access is an access controlled feature. Since the feature is an access controlled feature, it cannot be accessed without an access key. Therefore, the user will submit a request to access the feature. The request can be submitted via, for example, a service request on the integration cloud service system and/or through correspondence with a product manager. The user will submit a request for an access key so that the user can access the feature. The cloud application can be, for example, an integrated cloud services application.

After the request is received to access the feature, the system can determine whether the user has satisfied the requirements for obtaining an access key. The requirements can be based on particular user information. If the user has satisfied the requirements for obtaining an access key, at step 120, an access key can be dynamically generated based on the user information. The user information can be provided by the user or the user information can be determined based on user information stored on the integration cloud service system. User information can include a user role and/or permissions, environment information, system version information, and feature information. The access key is dynamic based on the user information that is received and/or obtained in order to determine access to the feature.

The access key is dynamic in that the access key will vary according to the user information. Therefore, an access key that is generated at a first time for a particular user can be different from an access key that is generated at a second time for the same user if the user information is different. However, if the user information that is provided at the first time and the second time are the same, the access key may be the same.

An access key can be a string of multiple characters. An access key can include numbers and letters. An example access key is "ec5dca40ab01552b4ae3171fe75f7fd4." The number of characters in the string that makes up the access key can vary so long as the access key can uniquely identify the user information. The access key is generated based on user information. For example, if the user information includes environment information, cloud application instance information, and selected feature information, then the generated access key characters that will uniquely identify the environment information, cloud application instance information, and selected feature information of the user. The user information that corresponds to the access key can vary depending on the requirements for a particular feature.

An access key can be valid for a predetermined period of time. Therefore, an access key can be used repeatedly by the same user as long as the access key corresponds to the same user information. Alternatively, an access key that is generated may be a single use access key. That is a user may be permitted to use the access key only a single time.

An access key cannot be used by, for example, a different user or for a different environment than the user or the environment information that was used to generate the access key. That is, the access key that is input, in order to execute a feature, should correspond to the user information that was provided to generate the access key. Further, the amount of access that can be allowed can vary based on the access key. For example, some access keys may provide more access to a controlled feature, whereas other access keys may provide more restricted access to an controlled feature.

After the access key has been generated, the access key can be provided to the user so that the user can initiate validation of the access key. The user can provide the access key to the integration cloud service system, and at step 130, the access key can be validated by the integration cloud service system. Specifically, the application in the integration cloud service system that the user desires to access, can validate the access key.

If the application in the integration cloud service system determines that the access key is valid, at step 140 the application feature can be executed for the cloud application instance as requested by the user. That is, the user will be granted access to the access controlled feature for the application.

II. System

Figure 2:
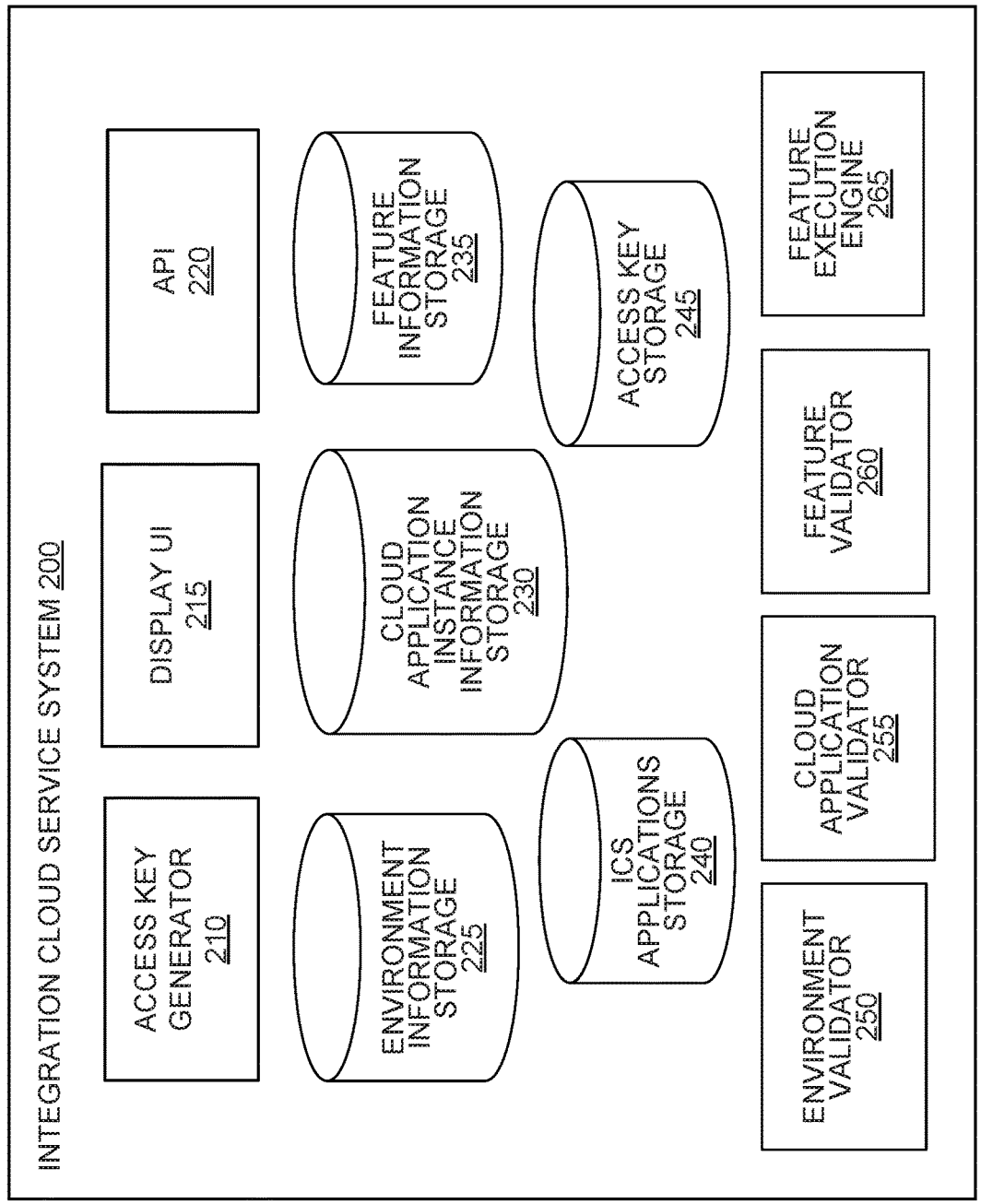
FIG. 2 illustrates a system for generating and validating an access key, in accordance with some example embodiments.

FIG. 2 illustrates a system 200 for generating and validating an access key, in accordance with some example embodiments.

As shown in FIG. 2, the integration cloud service system 200 can include an access key generator 210, a display user interface 215, an application programming interface (API) 220, environment information storage 225, cloud application instance information storage 230, feature information storage 235, integration cloud service (ICS) applications 240, access key storage 245, environment validator 250, cloud application validator 255, feature validator 260, and feature execution engine 265.

The access key generator 210 can generate the access key. Access key generator 210 can generate an access key based on, for example, cloud application instance information, an application feature information, and/or environment information. The cloud application instance information, application feature information, and/or environment information can be provided to the access key generator 210 in the request made by the user. The cloud application instance information can come from internal data sources and/or can be identified by the application user directly. The application feature information can include a unique identifier of the application feature.

A display user interface 215 can be an interface on which the user enters access key. The user interface 215 can be specific to a particular type of feature. Further, each feature may have its own user interface. Therefore, an access key can entered on a user interface that is specific to the feature the user desires to access.

An application programming interface (API) 220 can be another interface through which the user enters the access key. API 220 can be, for example, a Representational State Transfer (REST) API.

Environment information storage 225 can store environment information of the user. Environment information can include an identifier for the environment. An identifier for environment information of a first user can be different from an identifier for environment information of a second user. Therefore different users will have different environment information.

Further, environment information for a single user can also vary. For example, a user can have a production environment, a development environment, and a test environment. Development, test, and production environments are separate environments in the integration cloud service system. A development environment can be used to develop an integration using non-production source and target applications. A test environment can be used to test and verify an integration. Aspects of the development environment and the test environment can be combined or they can be separate environments. Once tested and verified, the integration can be exported from the development environment or test environment and imported into the production environment. A production environment can include an environment in which the application is running, and is executed. In the production environment, an integration can be executed against production source and target applications. A single user can have one or more development environments, one or more test environments and one or more production environments. For example, a user can have different production environments for different countries (e.g., one for U.S. and one for Euro-Asia).

The production environment identifying information of the user will be different from the development environment identifying information of the same user. The environment information stored in the environment information storage 225 can include unique identifying information regarding a production environment or a development environment of a user. Therefore, different environments of a same user will have different identifiers. The identifier for the environment can include a character string that uniquely identifies the environment. Therefore, an environment (e.g., development, test, production, etc.) is uniquely identifiable so that an access key that is generated for one environment will not work with another environment even if all other information used in generating the key is the same.

Cloud application instance information storage 230 can store cloud application instance information of the user. Within the environment of the user (e.g., development environment or production environment), the user will be running a specific version of an integration cloud service system. Cloud application instance information can include version information about an integration cloud service system. The cloud application instance information can be, for example, a value (e.g., numerical, alphanumerical) that identifies the version of the integration cloud service system.

Feature information storage 235 can store feature information, such as feature identifying information. The feature identifying information uniquely identifies features that can be accessed in an integration cloud service system. Features can include an early uptake mode, start run request, pause run request, resume run request, stop run request, delete run request, post compression, post migration and put recovery config. Feature identifying information can uniquely identify each of these features. Therefore, the feature that the user requests to access can be identified through the feature information.

Integration cloud service (ICS) applications storage 240 can store information for a plurality of different applications. For example, ICS applications storage 240 can store data related to sales applications, marketing applications, human resources applications, etc. These are merely examples, and data for various kinds of applications that can be used in the integration cloud service system 200 can be stored in ICS applications storage 240.

Access key storage 245 can store an access key that is generated by the access key generator 210.

Environment validator 250 can validate the environment information of the user. Based on the access key that is generated by the access key generator 210, the environment validator 250 can determine whether the access key is consistent with the environment information of the user. If the environment validator 250 validates the access key, it can be determined that the access key is valid for the environment information of the user.

Cloud application validator 255 can validate the cloud application information of the user. Based on the access key that is generated by the access key generator 210, the cloud application validator 255 can determine whether the access key is consistent with the cloud application information of the user. If the cloud application validator 255 validates the access key, it can be determined that the access key is valid for the cloud application of the user.

Feature validator 260 can validate the feature information for the feature requested by the user. Based on the access key that is generated by the access key generator 210, feature validator 260 can determine whether the access key is consistent with the feature the user desires to access. If the feature validator 260 validates the access key, it can be determined that the access key is valid for the feature requested by the user.

The feature execution engine 265 can execute the feature in the cloud application for the user. Based on the requirements for the feature, and if an input access key is determined to be valid and satisfies the requirements for accessing the feature, then feature execution engine 265 can execute the feature requested by the user.

The above elements are merely examples and the system can include fewer or more elements than that shown in FIG. 2.

III. Access Key Generation

Figure 3:
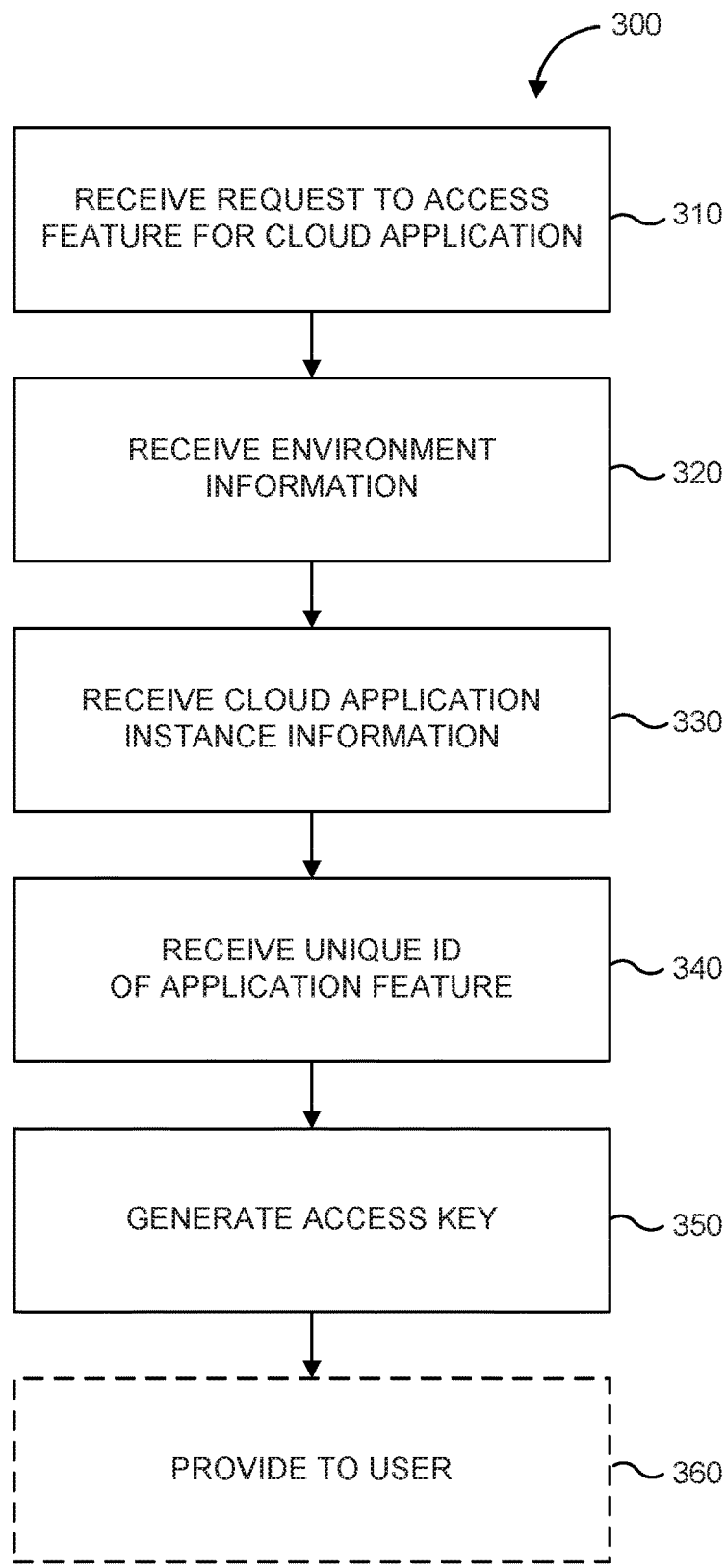
FIG. 3 illustrates a method for generating an access key, in accordance with some example embodiments.

FIG. 3 illustrates a method 300 for generating an access key, in accordance with some example embodiments.

At step 310, a request can be received to access a feature for a cloud application. The request can be received by the integration cloud service system 200 is shown in FIG. 2. The requests can be received from, for example, an end user of the integration cloud service system 200. The user may submit a request through a service request on the integration cloud service system. Alternatively, the user may submit the request to the product manager.

At step 320, the system receives environment information of the user. The environment information can include production environment information, and development environment information. During validation, the integration cloud service system 200 can determine whether the feature the user desires to access is compatible with the environment information of the user. The environment information can be stored in an environment information storage 225.

At step 330, the system receives cloud application instance information. The cloud application instance information can include a version of the integration cloud service system used by the user. During validation, the integration cloud service system 200 can determine whether the version of the system used by the user is compatible with the feature that the user desires to access. The cloud application instance information can be stored in cloud application instance information storage 230.

At step 340, the system receives a unique ID of the application feature that the user desires to access. The unique ID of the application feature can be stored in feature information storage 235.

At step 350, the system generates the access key. The access key can be generated by the access key generator 210. The access key is a string of multiple characters that uniquely identifies the user information (e.g., environment information, cloud application instance information, feature information).

At step 360, the access key that was generated can be provided to the user. The access key can be provided to the user via, for example, an electronic communication, such as an email. Further, the access key can be provided in a communication such as a service request. Therefore, the user can copy the access key from the communication and insert the access key into the access key field of a user interface for the particular feature. However, this is merely an example and other methods for providing the access key so that the feature can be used can be used.

IV. Access Key Validation

Figure 4:
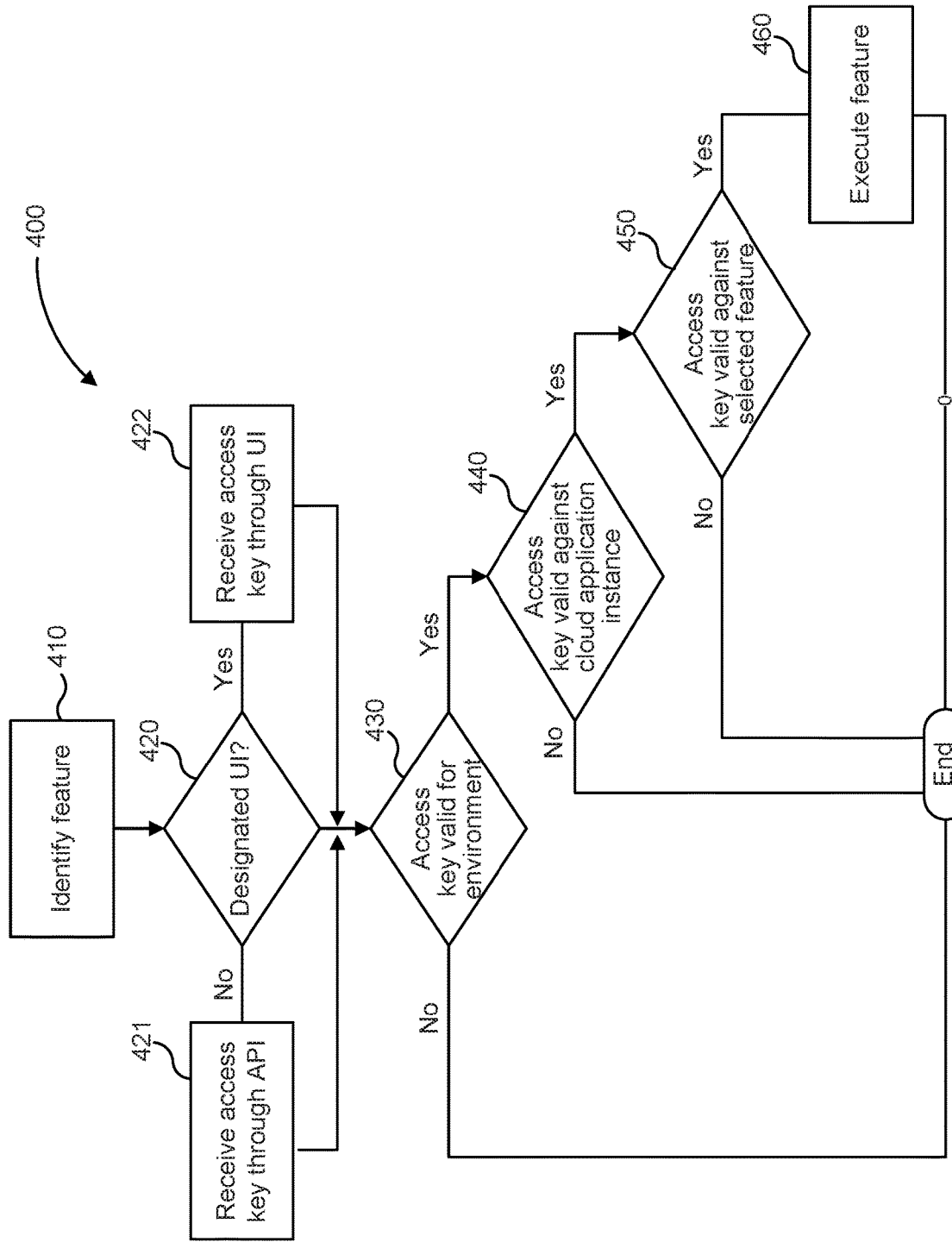
FIG. 4 illustrates a method for validating an access key, in accordance with some example embodiments.

FIG. 4 illustrates a method 400 for validating an access key, in accordance with some example embodiments. After an access key has been generated, as shown in FIG. 3, the access key can be validated.

At step 410, the feature that the user desires to access is identified. The user may select the particular feature on a user interface of the integrated cloud service system. For example, the user may indicate on an interface for the integrated cloud service system, that they would like to access the early uptake feature. They may select, for example, an image or an icon representing the feature on a dashboard for the integrated cloud service system.

At step 420, it is determined whether the feature has a designated user interface (UI). As indicated above, some access controlled features may have a designated user interface for entering an access key. If the feature has a designated user interface, at step 422, the access key can be received through the designated user interface.

Figure 5:
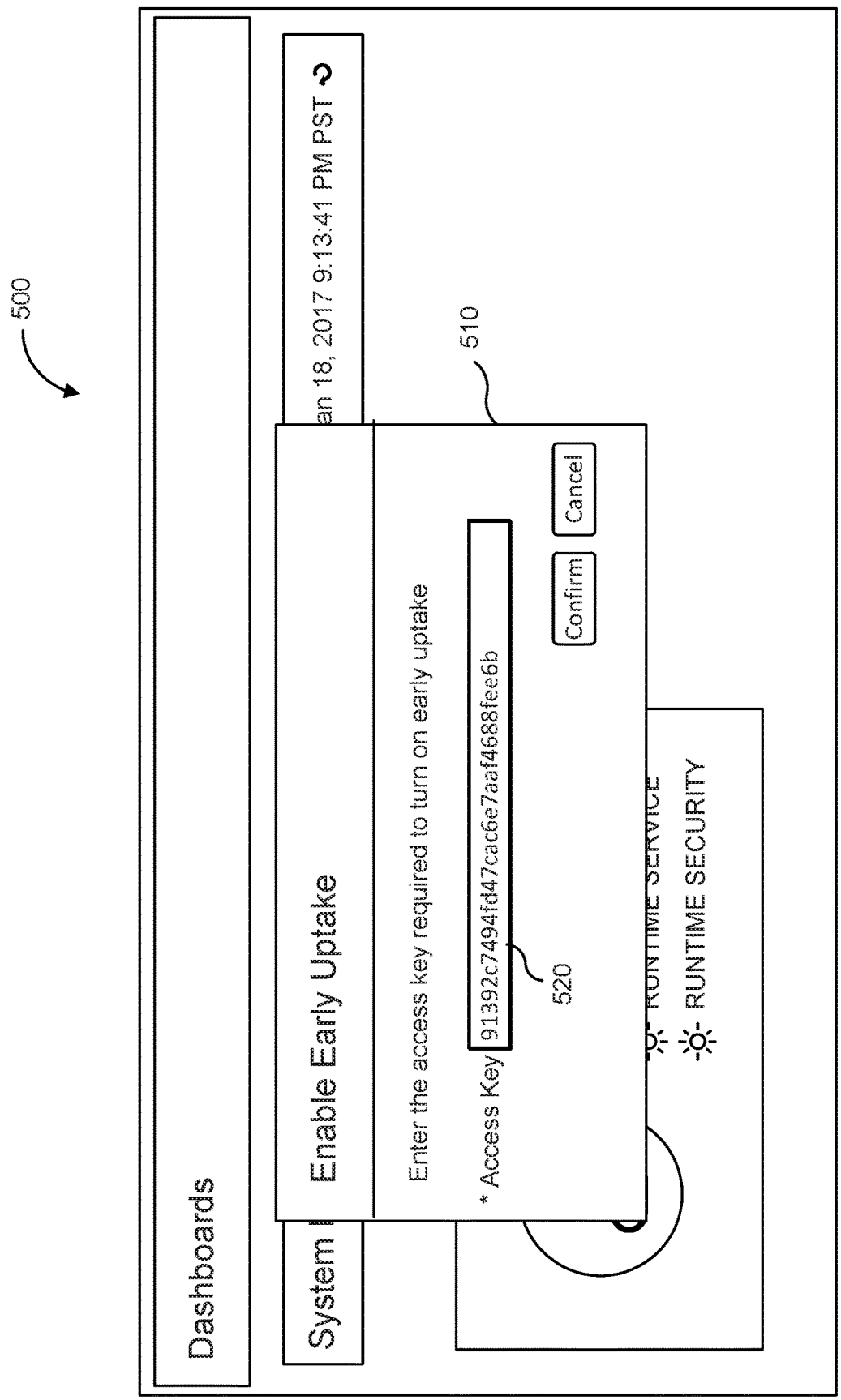
FIG. 5 illustrates an example user interface, in accordance with some example embodiments.

FIG. 5 illustrates an example user interface 500, in accordance with some example embodiments. A user interface as shown in FIG. 5, can make it easier for the user to access a feature. By providing a user interface for a particular feature, the user can easily enter an access key and determine whether the user is authorized to access the feature. The user interface shown in FIG. 5 is a designated user interface for an "early uptake" feature. An early uptake feature can be a feature which has been predetermined to require a priority level of access.

If a user desires to access the "early uptake" feature, after the user selects the early uptake feature, a pop-up window 510 can appear which prompts the user to enter an access key in order to access the early uptake feature. A pop-up will prompt the user to enter access key that was uniquely generated for the user's application. A pop-up window is shown in FIG. 5, however, the access key can be entered through another type of user interface. An access key can be entered by the user through the access key input field 520. After the user selects the confirmed button, the integration cloud service system can determine whether the key is valid. Based on the validity of the key, the user will either be allowed to access the feature or the user will be denied access to the feature. If the access key is valid, a flag can be enabled which will allow the user to see a feature that was not previously available to the user.

If the feature does not have a designated user interface, at step 421, the access key can be received through an application programming interface (API), such as a REST API.

Although two different methods of inputting the access key are described in FIG. 4, in another example embodiment, all access keys can be input the same way. For example, all access keys can be input to designated user interfaces or all access keys can be input through an API. However, by providing different ways of inputting the access key, different features can be prioritized. For example, a feature having a designated user interface may require a greater level of determining access than a feature that does not have a designated user interface.

At step 430, it is determined whether the access key that has been input is valid for the environment of the user. Specifically, it is determined whether the access key corresponds to the environment (e.g., production environment or development environment) of the user. If the access key is not valid for the environment of the user, then the process ends. If the access key is valid for the environment then the method proceeds to step 440.

At step 440, it is determined whether the access key is valid for the cloud application instance of the user. Specifically, it is determined whether the version of a cloud application instance associated with the access key corresponds to the version of the cloud application instance of the user. If the access key is not valid for the cloud application instance then the process ends. If the access key is valid for the cloud application instance of the user, then the method proceeds to step 450.

At step 450, it is determined whether the access key is valid for the selected feature. Specifically, it is determined whether the feature that is selected by the user corresponds with the access key. If the access key is not valid for the selected feature, then the process ends. If the access key is valid for the selected feature then the feature can be executed at step 460.

Although three levels of validation are shown in FIG. 4, the example embodiments are not limited to three levels of validation. For example, as shown in FIG. 6, two levels of validation are performed (e.g., cloud application instance validation and selected feature validation).

Further, although three levels of validation are shown in FIG. 4, one or more levels of validation can be performed and the example embodiments are not limited to three levels of validation. Further, fewer than three levels of validation may be performed. The number of levels of validation to be performed can vary as desired for the particular feature. Also, other types of validation other than those shown in FIG. 4 can be performed. These are merely examples and other types of validation may be performed so long as a particular feature for the particular customer in the particular environment can be uniquely identified. For example, other data may be used to validate an access key.

V. Access Key Generation and Validation Overview

Figure 6:
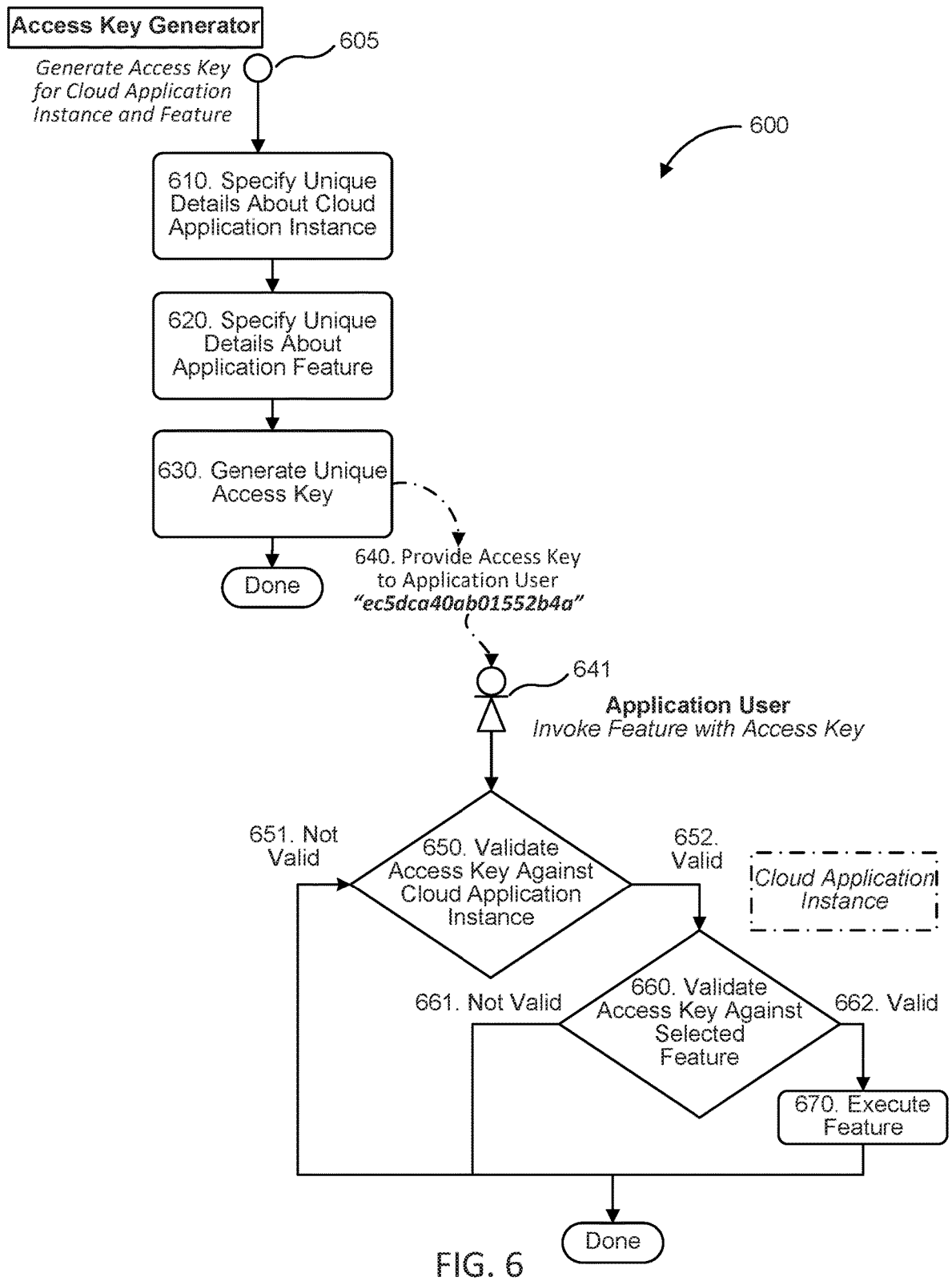
FIG. 6 illustrates a method for generating and validating an access key, in accordance with some example embodiments.

FIG. 6 illustrates a method 600 for generating and validating an access key, in accordance with some example embodiments. The steps shown in FIG. 6 may be similar to those shown in FIGS. 1, 3 and 4. In the example shown in FIG. 6, two levels of validation are performed, whereas in the example shown in FIG. 4, three levels of validation are performed.

After an access key generator 605 receives a request to generate an access key, the access key generators 605 will request information from the user in order to access the feature.

At step 610, information about a user's cloud application instance can be specified. At step 620, details about an application feature that a user desires to access can be specified. At step 630, and access key can be generated based on the cloud application instance information and the application feature information that was specified.

At step 640 the access key can be provided to the application user. At step 641, the application user can invoke the feature using their access key. For example, the user can enter the access key in a designated user interface or in an API. After the user has entered the access key, at step 650, the access key is validated against the cloud application instance information. It is determined whether the access key corresponds to the cloud application instance information of the user. If the access key does not correspond to the cloud application instance information of the user, then the access key is determined to not be valid at step 651. If the access key corresponds to the cloud application instance information of the user that was specified at step 620, then at step 652, the access key is determined to be valid for the cloud application instance.

At step 660, the access key is validated against the feature that was selected by the user. It is determined whether the access key corresponds to the feature that is selected by the user as specified in step 620. If the access key does not correspond to the feature that was specified by the user at step 620, at step 661, the access key is determined to not be valid for the selected feature. If the access key corresponds to the feature that was specified by the user at step 620, at step 662, the access key is determined to be valid for the selected feature.

After the validation has been completed at step 670 the user can execute the feature on the cloud application. In the example embodiments, generation and validation of the access key is performed with respect to environment information, cloud application instance information, and feature information, however, these are merely examples and generation and validation of the access key can be performed based on other user information such as roles, names, etc. so long as a unique access key can be generated.

By receiving unique user information, a secure access key can be generated based on the unique user information. Further, security is enhanced since only an access key that corresponds to the unique user information can be used to access a requested feature.

VI. Computer System

Figure 7:
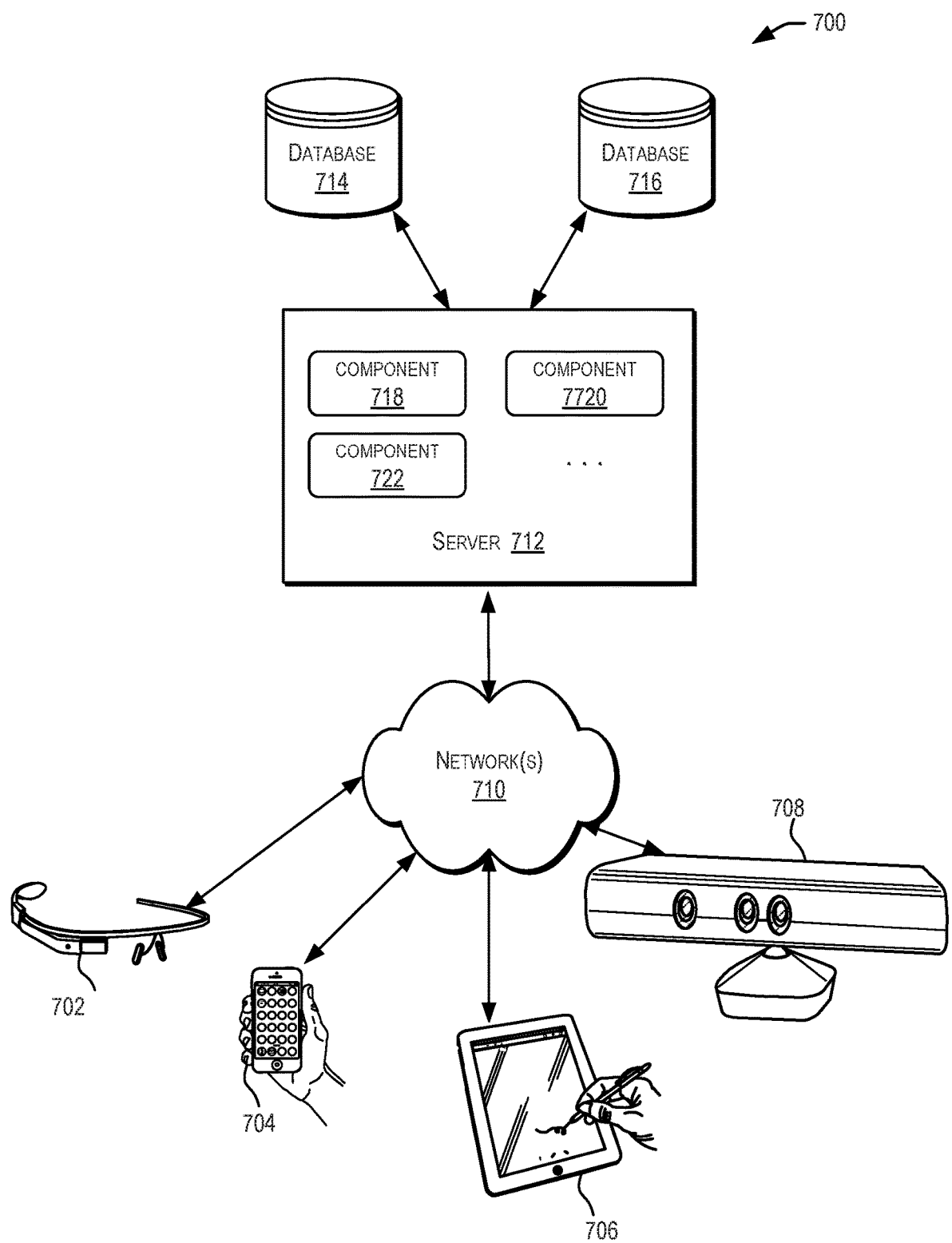
FIG. 7 illustrates a simplified diagram of a distributed system for implementing some example embodiments.
Figure 8:
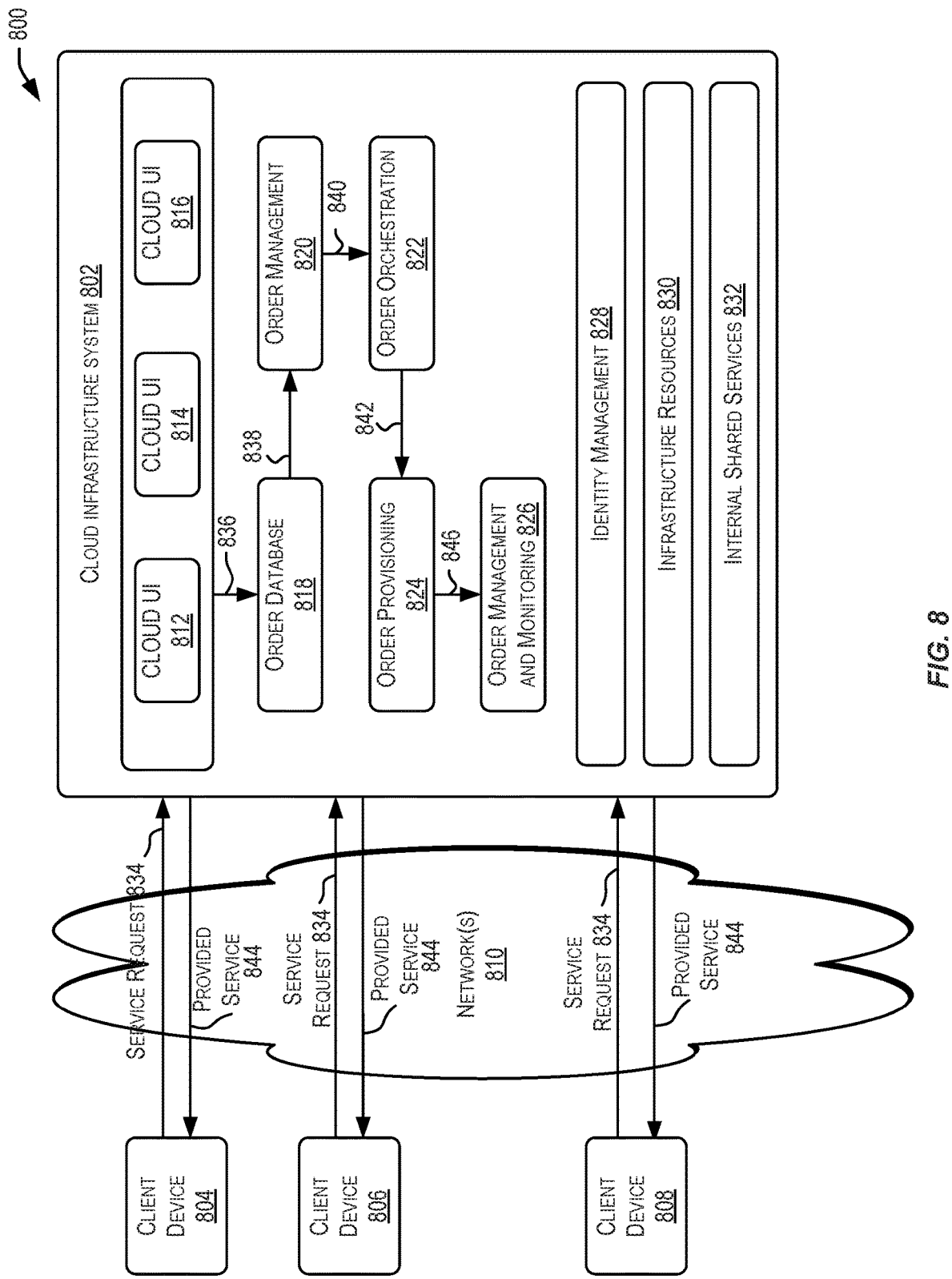
FIG. 8 illustrates a simplified block diagram of one or more components of a system environment in which services may be offered as cloud services, in accordance with some example embodiments.
Figure 9:
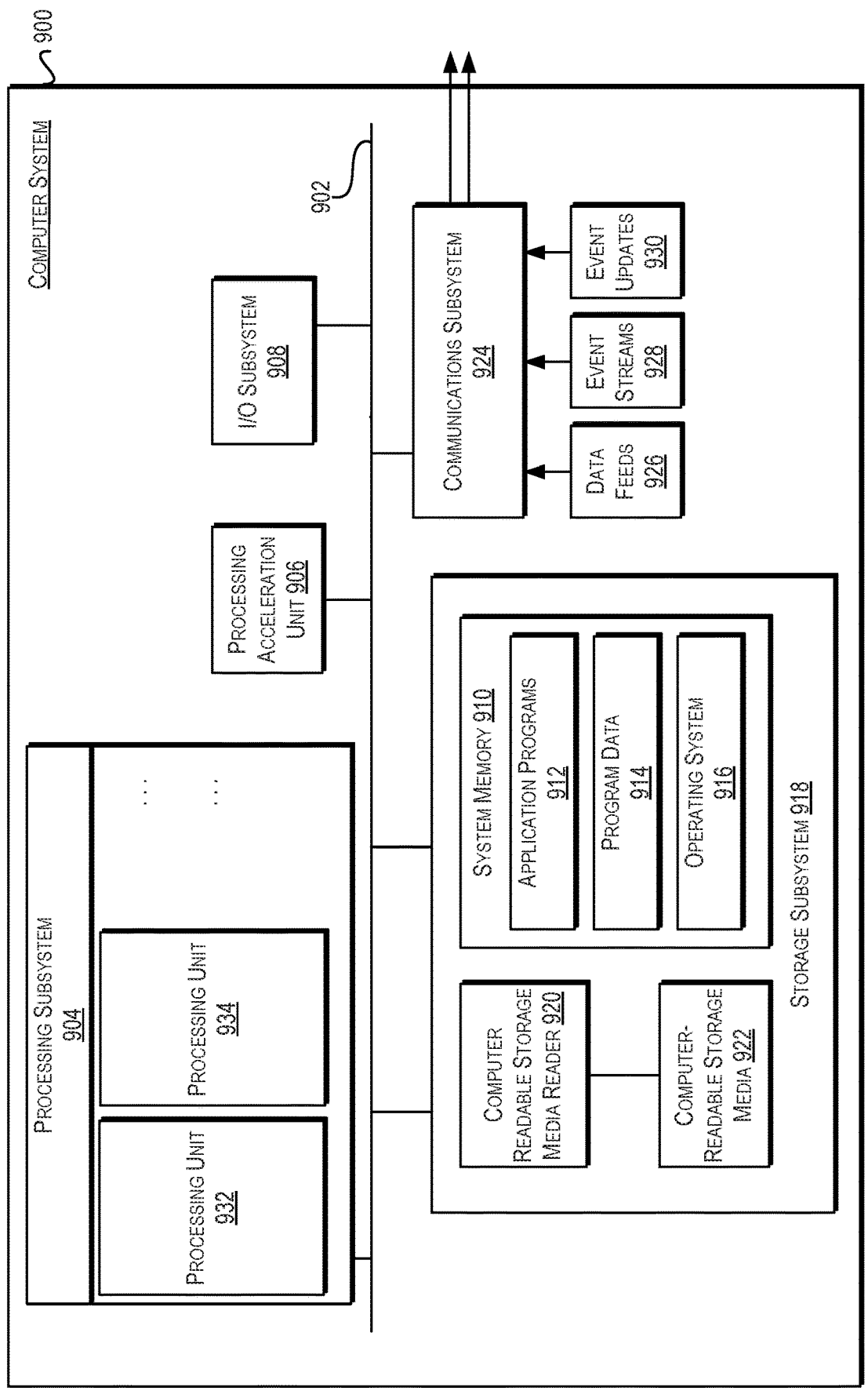
FIG. 9 illustrates an exemplary computer system that may be used to implement certain components according to some example embodiments.

FIGS. 7, 8, and 9 illustrate exemplary hardware and/or software configurations used in various embodiments.

FIG. 7 illustrates a simplified diagram of a distributed system for implementing some example embodiments. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various embodiments, server 712 may be adapted to run one or more services or software applications such as services and applications that provide code and/or data for performing efficient application configuration patching for applications executing at the server 712 or another server. In certain embodiments, server 712 may also provide other services or software applications that can include non-virtual and virtual environments. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, software components 718, 720 and 722 of system 700 are shown as being implemented on server 712. As one example, one or more of the components (e.g., software component 718) may be the configuration patch module or binary patch module discussed throughout the application.

In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in FIG. 7 is thus one example of a distributed system for implementing an embodiment system and is not intended to be limiting.

Client computing devices 702, 704, 706, and/or 708 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 710.

Although distributed system 700 in FIG. 7 is shown with four client computing devices, any number of client computing devices may be supported. Other devices, such as devices with sensors, etc., may interact with server 712.

Communication network(s) 710 in distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 70 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red (IR) network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization. One or more flexible pools of logical storage devices can be virtualized to maintain virtual storage devices for the server. Virtual networks can be controlled by server 712 using software defined networking. In various embodiments, server 712 may be adapted to run one or more services or software applications described in the foregoing disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

Distributed system 700 may also include one or more databases 714 and 716. These databases may provide a mechanism for storing information such as user interactions information, usage patterns information, adaptation rules information, and other information used by example embodiments. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands. However, databases 714 and 716 may provide relational databases, object-oriented databases, object-relational databases, NoSQL databases, etc., and may or may not be SQL-based. For example, databases 714 and/or 716 may be Oracle Database, PostgreSQL, Microsoft SQL Server, MySQL, MemSQL, Memcached, Redis, MongoDB, BigTable, Cassandra, DB2, Solr, etc.

In some embodiments, code and/or data for performing efficient application configuration patching may be offered as services via a cloud environment. FIG. 8 is a simplified block diagram of one or more components of a system environment 800 in which services may be offered as cloud services, in accordance with some embodiments of the present disclosure. In the illustrated embodiment in FIG. 8, system environment 800 includes one or more client computing devices 804, 806, and 808 that may be used by users to interact with a cloud infrastructure system 802 that provides cloud services. Additionally, in some embodiments the "client" computing devices 804, 806, 808 may actually be server computers acting as a client in a client-server relationship, where the server may provide application configuration patching services. Cloud infrastructure system 802 may comprise one or more computers and/or servers that may include those described above for server 712.

It should be appreciated that cloud infrastructure system 802 depicted in FIG. 8 may have other components than those depicted. Further, the embodiment shown in FIG. 8 is one example of a cloud infrastructure system that may incorporate an example embodiment. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708. Client computing devices 804, 806, and 808 may be configured to operate a client application such as a web browser, a proprietary client application (e.g., Oracle Forms), or some other application, which may be used by a user of the client computing device to interact with cloud infrastructure system 802 to use services provided by cloud infrastructure system 802. Although exemplary system environment 800 is shown with three client computing devices, any number of client computing devices may be supported. Other devices such as devices with sensors, etc. may interact with cloud infrastructure system 802.

Communication network(s) 710 may facilitate communications and exchange of data between clients 804, 806, and 808 and cloud infrastructure system 802. Each network may be any type of network familiar to those skilled in the art that can support data communications using any of a variety of commercially-available protocols, including those described above for communication network(s) 710.

In certain embodiments, services provided by cloud infrastructure system 802 may include a host of services that are made available to users of the cloud infrastructure system on demand. In addition to services related to providing code and/or data for performing efficient application configuration patching operations, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 802 may also provide "big data" related computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle Corporation) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database-as-a-Service (DaaS) in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform, and other resources.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 to enable provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 802, and the like.

In one embodiment, as depicted in FIG. 8, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In an exemplary operation, at 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI) such as cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

At 836, the order information received from the customer may be stored in an order database 818. If this is a new order, a new record may be created for the order. In one embodiment, order database 818 can be one of several databases operated by cloud infrastructure system 818 and operated in conjunction with other system elements.

At 838, the order information may be forwarded to an order management module 820 that may be configured to perform billing and accounting functions related to the order, such as verifying the order, and upon verification, booking the order.

At 840, information regarding the order may be communicated to an order orchestration module 822 that is configured to orchestrate the provisioning of services and resources for the order placed by the customer. In some instances, order orchestration module 822 may use the services of order provisioning module 824 for the provisioning. In certain embodiments, order orchestration module 822 enables the management of business processes associated with each order and applies business logic to determine whether an order should proceed to provisioning.

As shown in the embodiment depicted in FIG. 8, at 842, upon receiving an order for a new subscription, order orchestration module 822 sends a request to order provisioning module 824 to allocate resources and configure resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. This enables order orchestration module 822 to be isolated from implementation details, such as whether or not services and resources are actually provisioned on the fly or pre-provisioned and allocated/assigned upon request.

At 844, once the services and resources are provisioned, a notification may be sent to the subscribing customers indicating that the requested service is now ready for use. In some instance, information (e.g. a link) may be sent to the customer that enables the customer to start using the requested services.

At 846, a customer's subscription order may be managed and tracked by an order management and monitoring module 826. In some instances, order management and monitoring module 826 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 800 may include an identity management module 828 that is configured to provide identity services, such as access management and authorization services in cloud infrastructure system 900. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

FIG. 9 illustrates an exemplary computer system 900 that may be used to implement certain components according to some example embodiments. In some embodiments, computer system 900 may be used to implement any of the various servers and computer systems described above. As shown in FIG. 9, computer system 900 includes various subsystems including a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors (GPUs), digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above for performing efficient application configuration patching operations.

In certain embodiments, a processing acceleration unit 906 may be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term "input device" is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 900. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used in accordance with the some example embodiments.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 9, system memory 910 may store application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 922 may store programming and data constructs that provide the functionality of some embodiments. Software (programs, code modules, instructions) that when executed by processing subsystem 904 a processor provide the functionality described above may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 922 may provide storage of computer-readable instructions, data structures, program modules, and other data for computer system 900.

In certain embodiments, storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, computer system 900 may provide support for executing one or more virtual machines. Computer system 900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 900. Accordingly, multiple operating systems may potentially be run concurrently by computer system 900. Each virtual machine generally runs independently of the other virtual machines.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific example embodiments have been described, various modifications, alterations, alternative constructions, and equivalents are also encompassed within the scope of the example embodiments. The example embodiments are not restricted to operation within certain specific data processing environments, but are free to operate within a plurality of data processing environments. Additionally, although example embodiments have been described using a particular series of transactions and steps, it should be apparent to those skilled in the art that the scope of the example embodiments are not limited to the described series of transactions and steps. Various features and aspects of the above-described embodiments may be used individually or jointly.

Further, while example embodiments have been described using a particular combination of hardware and software, it should be recognized that other combinations of hardware and software are also within the scope of the example embodiments. The example embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific example embodiments have been described, these are not intended to be limiting. Various modifications and equivalents are within the scope of the following claims.

What is claimed is:

1. A method for providing access to an application feature, the method comprising:
   receiving, by an integration cloud service system of a cloud environment, a request to access an access controlled feature in an application in the cloud environment, wherein the access controlled feature is configured to be accessed by using an access key that is generated based on user information;
   dynamically generating, by the integration cloud service system, the access key for the access controlled feature in the application based on the user information, wherein the user information comprises at least one from a group consisting of a user role, a user permission, user environment information, user system version information, and feature information;
   validating, by the integration cloud service system, the access key for the access controlled feature in the application based on the user information; and
   in response to the access key being valid, executing, by the integration cloud service system the access controlled feature in the application.

2. The method according to claim 1, wherein the user information comprises environment information, a cloud application instance information, and a unique ID of the application feature.

3. The method according to claim 2, wherein the environment information comprises one of a production environment, a development environment, and a test environment.

4. The method according to claim 2, wherein the cloud application instance information comprises a version number of the integration cloud service system.

5. The method according to claim 2, wherein the access key comprises a string of characters that uniquely identifies the environment information, the cloud application instance information, and the unique ID of the application feature.

6. The method according to claim 5, wherein the validating the access key for the feature in the application comprises:
   receiving, on a user interface for the access controlled feature, the access key; and
   determining whether the access key corresponds to at least one of the environment information, the cloud application instance information, and the unique ID of the application feature; and
   in response to the access key corresponding to one of the environment information, the cloud application instance information, and the unique ID, determining that the access key is valid.

7. The method according to claim 5, wherein the validating the access key for the feature in the application comprises:
   receiving, on a user interface for the access controlled feature, the access key;
   determining whether the access key corresponds to the environment information, the cloud application instance information, and the unique ID of the application feature; and
   in response to the access key corresponding to the environment information, the cloud application instance information, and the unique ID, determining that the access key is valid.

8. The method according to claim 1, wherein the feature comprises a functionality configured to be applied to the application.

9. The method according to claim 1, wherein the application is an integrated cloud service application.

10. The method according to claim 1, wherein an end user device of the integration cloud service system receives the request to access the access controlled feature in the application.

11. A computing device for providing access to an application feature, the computing device comprising:
   a memory; and
   one or more processors in an integration cloud service system of a cloud environment, the one or more processors configured to:
      receive a request to access an access controlled feature in an application in the cloud environment, wherein the access controlled feature is configured to be accessed by using an access key that is generated based on user information;
      dynamically generate the access key for the access controlled feature in the application based on the user information;
      validate the access key for the access controlled feature in the application based on the user information, wherein the user information comprises at least one from a group consisting of a user role, a user permission, user environment information, user system version information, and feature information; and
      in response to the access key being valid, execute the access controlled feature in the application.

12. The computing device according to claim 11, wherein the user information comprises environment information, a cloud application instance information, and a unique ID of the application feature.

13. The computing device according to claim 12, wherein the environment information comprises one of a production environment, a development environment, and a test environment.

14. The computing device according to claim 12, wherein the cloud application instance information comprises a version number of the integration cloud service system.

15. The computing device according to claim 12, wherein the validating the access key for the feature in the application comprises:
   receiving, on a user interface for the access controlled feature, the access key;
   determining whether the access key corresponds to the environment information, the cloud application instance information, and the unique ID of the application feature; and
   in response to the access key corresponding to the environment information, the cloud application instance information, and the unique ID, determining that the access key is valid.

16. A non-transitory computer readable storage medium storing instructions which, when executed by one or more processors of a computing device, cause the one or more processors to perform a method comprising:
   receiving, by an integration cloud service system of a cloud environment, a request to access an access controlled feature in an application in the cloud environment, wherein the access controlled feature is configured to be accessed by using an access key that is generated based on user information;
   dynamically generating, by the integration cloud service system, the access key for the access controlled feature in the application based on the user information, wherein the user information comprises at least one from a group consisting of a user role, a user permission, user environment information, user system version information, and feature information;

validating, by the integration cloud service system, the access key for the access controlled feature in the application based on the user information; and in response to the access key being valid, executing, by the integration cloud service system the access controlled feature in the application.

17. The computer readable storage medium according to claim 16, wherein the user information comprises environment information, a cloud application instance information, and a unique ID of the feature in the application.

18. The computer readable storage medium according to claim 17, wherein the environment information comprises one of a production environment, a development environment, and a test environment.

19. The computer readable storage medium according to claim 17, wherein the cloud application instance information comprises a version number of the integration cloud service system.

20. The computer readable storage medium according to claim 17, wherein the validating the access key for the feature in the application comprises:

receiving, on a user interface for the access controlled feature, the access key;

determining whether the access key corresponds to the environment information, the cloud application instance information, and the unique ID of the feature in the application ; and in response to the access key corresponding to the environment information, the cloud application instance information, and the unique ID, determining that the access key is valid.

* * * * *

UNITED STATES PATENT AND TRADEMARK OFFICE
CERTIFICATE OF CORRECTION

PATENT NO. : 10,657,239 B2
APPLICATION NO. : 15/720940
DATED : May 19, 2020
INVENTOR(S) : Gravenites et al.

Page 1 of 1

It is certified that error appears in the above-identified patent and that said Letters Patent is hereby corrected as shown below:

In the Specification

In Column 9, Line 16, after "enter" insert -- the --.

In the Claims

In Column 26, Line 13, in Claim 20, delete "application ;" and insert -- application; --, therefor.

Signed and Sealed this
Fourth Day of May, 2021

Drew Hirshfeld
*Performing the Functions and Duties of the
Under Secretary of Commerce for Intellectual Property and
Director of the United States Patent and Trademark Office*